UNITED STATES PATENT OFFICE.

FRIEDRICH RUNKEL AND MARTIN HERZBERG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

932,813.  Specification of Letters Patent.  Patented Aug. 31, 1909.

No Drawing.  Application filed April 16, 1909. Serial No. 490,227.

*To all whom it may concern:*

Be it known that we, FRIEDRICH RUNKEL and MARTIN HERZBERG, doctors of philosophy, chemists, citizens of the German Empire, residing at Elberfeld, Germany, have invented new and useful Improvements in Azo Dyes, of which the following is a specification.

Our invention relates to the manufacture and production of new azo dyes which can be obtained by combining the diazo compounds of one molecule of an aminophenylether of the formula: $NH_2.C_6H_4-O.C_6H_5$ and one molecule of another diazo compound with one molecule of an 1-8-aminonaphthol sulfonic acid.

The new dyestuffs are after being dried and pulverized in the shape of their sodium salts dark powders soluble in water. Upon reduction with stannous chlorid and hydrochloric acid they are decomposed an aminophenylether an amino compound and a diamino-1.8-aminonaphthol sulfonic acid are obtained.

The new coloring matters dye wool from blue to green to black shades remarkable for their fastness to washing and to milling.

In order to carry out our process we can *e. g.* proceed as follows, the parts being by weight: 16.2 parts of 2.5-dichloroanilin are dissolved in 160 parts of hot water and 160 parts of hot crude hydrochloric acid, ice is added and the dichloroanilin is diazotized with 7.1 parts of sodium nitrite. Half of the excess of hydrochloric acid is then neutralized with sodium carbonate and 31.9 parts of freshly precipitated 1.8.3.6-aminonaphthol-disulfonic acid are added to the mass of the reaction which has to be stirred for about 6 hours. The rest of the hydrochloric acid is then almost completely neutralized with sodium acetate. The stirring of the mixture which has to show a slightly acid reaction on congo paper is continued for some hours. The mass is heated to 40–50° C. until the copulation is complete. After it has been rendered alkaline with sodium carbonate the diazo compound of 18.5 parts of ortho-aminophenylether

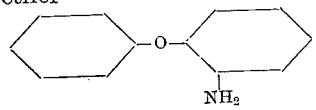

are added. After some time the precipitated dye is filtered off, redissolved from hot water, filtered off, pressed and dried. It is after being dried and pulverized in the shape of its sodium salt a dark powder soluble in water with a dark greenish-blue color and soluble in concentrated sulfuric acid with a dark-green color. Upon reduction with stannous chlorid and hydrochloric acid the new dye is decomposed, 2.5 - dichloroanilin, ortho-aminophenylether and 1.2.7-triamino-8-naphthol-3.6-disulfonic acid are obtained.

The new dyestuff dyes wool greenish-blue-black shades fast to washing and to milling.

The process is carried out in an analogous manner for the production of other of the above mentioned dyestuffs *e. g.* from 1.8-aminonaphthol-4-sulfonic acid, 1.8-aminonaphthol-4.6-disulfonic acid etc. and other aminophenylethers, *e. g.* para- or meta-aminophenylether or on using other diazo compounds for the manufacture of the new dyestuffs *e. g.* para-sulfanilic acid, 4-chloroanilin-2-sulfonic acid, para-toluidin-meta-sulfonic acid, ortho- or para-chloroanilin, para- or meta-nitranilin, para- or ortho-toluidin, anilin, 1 - methyl - 2 - amino - 4-nitrobenzene, 1-naphthylamin, etc.

We claim:

1. The herein described new disazo dyestuffs obtainable from 1 molecule of a diazotized aminophenylether, 1 molecule of another diazo compound and 1 molecule of an 1.8-aminonaphthol-sulfonic acid, which are after being dried and pulverized in the shape of their sodium salts dark powders soluble in water; yielding upon reduction with stannous chlorid and hydrochloric acid an aminophenylether, another amino compound and a diamino-1.8-aminonaphthol-sulfonic acid; and dyeing wool from blue to green to black shades remarkable for their fastness to washing and to milling, substantially as described.

2. The herein-described new disazo dyestuff obtainable from diazotized ortho-aminophenylether, diazotized dichloroanilin and 1.8-aminonaphthol-3.6-disulfonic acid, which dye is after being dried and pulverized in the shape of its sodium salt a dark powder soluble in water with a dark greenish-blue color and soluble in concentrated sulfuric acid with a dark green color; yielding upon reduction with stannous chlorid and hydrochloric acid ortho-aminophenylether, dichloroanilin and 1.2.7-triamino-8-naphthol-3.6-disulfonic acid; and dyeing wool greenish blue-black shades remarkable for their fastness to washing and to milling, substantially as described.

In testimony whereof we have hereunto set our hands in the presence of two subscribing witnesses.

FRIEDRICH RUNKEL. [L. S.]
MARTIN HERZBERG. [L. S.]

Witnesses:
OTTO KÖNIG,
C. J. WRIGHT.